Sept. 21, 1965 D. P. MARQUIS ETAL 3,207,867
DIRECTION SIGNAL SWITCH OPERATING MECHANISM
Filed Feb. 13, 1963

INVENTORS
Donald P. Marquis,
BY & Melvin A. Schultz

Paul J. Ethington
ATTORNEY

United States Patent Office 3,207,867
Patented Sept. 21, 1965

3,207,867
DIRECTION SIGNAL SWITCH OPERATING MECHANISM
Donald P. Marquis, Saginaw, and Melvin A. Schultz, Bay City, Mich., assignors to General Motors Corporation, Detroit, Mich., a corporation of Delaware
Filed Feb. 13, 1963, Ser. No. 258,320
6 Claims. (Cl. 200—61.34)

This invention relates to switch operating mechanisms and more particularly to direction signal switch operating mechanisms for use on motor vehicles.

It has been proposed to substitute plastic turn signal actuators for the conventional actuators presently in use in turn signal devices. In this manner it is possible to integrate certain parts such as the conventional canceling fingers and the resilient detent means used for holding the actuator member in its left, right, or neutral position. This substitution has not proven entirely satisfactory, however, since the plastic actuator member is under a steady load in each of its operating positions. Because of this constant stress, the plastic tends to cold flow thereby rendering the device inoperable.

The aforementioned deficiencies in the prior art have been eliminated by applicant's invention by employing novel overcenter locking means to snap a deformable actuator member into and out of its neutral or switch operating positions. In accordance with this invention, the actuator member is subjected to a deforming force only during movement from one position to another position and is not operating under a constant deforming load.

Figure 1:
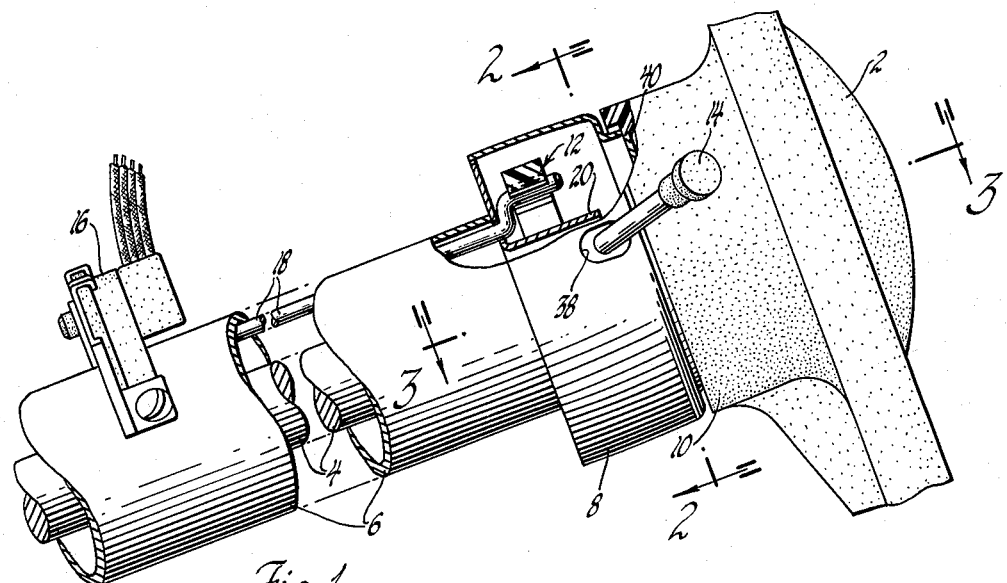
FIGURE 1 is a fragmentary side elevation view of a vehicle steering column assembly, certain parts being broken away to more clearly illustrate the construction.

Referring now to the drawings and particularly to FIGURE 1, there is illustrated a portion of the vehicle steering column assembly in which a steering wheel 2 is secured to the upper end of a steering shaft 4 in the conventional manner. Disposed in concentric surrounding relation about shaft 4 is a steering column or mast jacket 6 which extends between the steering wheel 2 and the vehicle steering gear mechanism, not shown.

At its upper end, jacket 6 is provided with a relatively shallow large diameter housing 8 which is spaced slightly axially from the base 10 of steering wheel 2. Disposed interior of housing 8 is a direction signal switch operating mechanism 12 adapted for manual setting by an operating handle 14 to either of two signal operating positions and effective upon rotation of the steering wheel in an opposite direction to automatically return the mechanism to neutral from either operating position. A multiposition electrical switch 16 is driven by the operating mechanism 12 through a rod 18 which extends interiorly of column 6. Since the precise construction of the switch 16 and the means by which it is connected with the operating mechanism is substantially identical to that shown in Patent 2,863,013, William E. Brown et al., entitled, "Direction Signal," filed September 14, 1955, and assigned to General Motors Corporation, a detailed description thereof will be omitted. It will be understood, however, that the invention is not limited to any particular type of switch or connecting means, the form shown being for illustrative purposes only.

Figure 2:
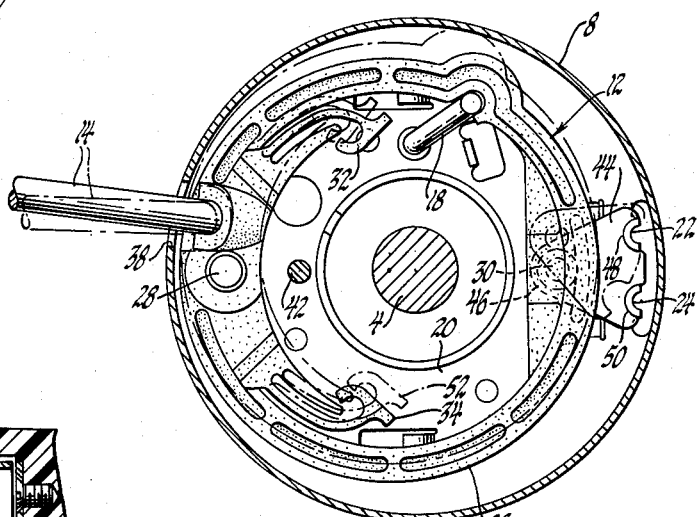
FIGURE 2 shows the switch operating mechanism in section on line 2—2 of FIGURE 1 with phantom lines showing the switch operating mechanism in its left turn position.
Figure 3:
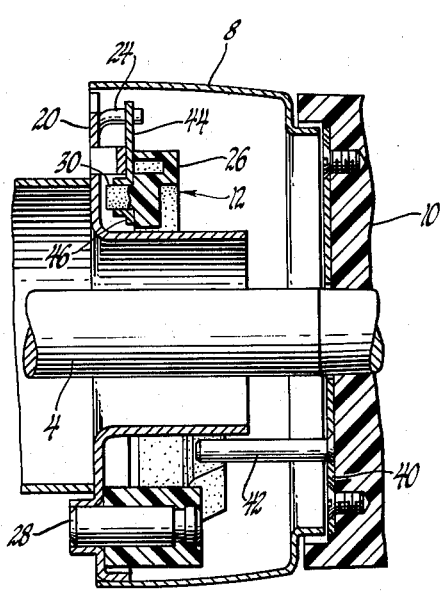
FIGURE 3 is a sectional view taken along lines 3—3 of FIGURE 1.

Referring now to FIGURES 2 and 3, the direction signal switch operating mechanism 12 comprises a ring-shaped support member 20 disposed within and supported by the housing 8 and having cylindrically shaped pivot posts 22 and 24 extending therefrom. A ring-shaped deformable actuating member 26 formed of molded plastic or other suitable material is pivotably mounted on the support member 20 by the pin 28. The actuating member 26 has a boss 30 and canceling fingers 32 and 34 integrally formed therewith. An operating handle 14 extends through a circumferential slot 38 in housing 8 and is secured in a suitable manner to actuating member 26 near the pivot pin 28 to permit manual rocking movement of the actuating member 26 about the pivot pin 28 to its various positions. Secured to the base of the steering wheel 10 is a circular plate 40 to which is attached a downwardly depending canceling pin 42 which functions as a rotatable cam. When the actuating member 26 is in the neutral position, the inner extremity of fingers 32 and 34 occupy positions which do not interfere with the circular path defined by canceling pin 42 when the steering wheel 2 is rotated. However, when the actuating member 26 is manually shifted to the left turn switch operating position, the inner extremity of finger 34 moves inwardly with the actuating member 26 to a position intersecting the circular path of canceling pin 42. It will, of course, be understood that finger 32 will move with actuating member 26 to a corresponding but reversed position when the actuating member 26 is moved to the right turn switch operating position.

A triangular-shaped locking member 44 has a part designated 46 rotatably attached to the boss 30 of the actuating member 26 and has a pair of arcuate recesses 48 and 50 formed on the side opposite the part 46.

When the operating mechanism 12 is in the neutral position as shown in FIGURE 2, the recesses 48 and 50 engage the pivot posts 22 and 24, respectively. FIGURE 2 shows in dotted lines the position of the operating mechanism 12 when a left turn is being indicated. As the lever 14 rocks the actuating member 26 to the left turn position, the locking member 44 in conjunction with pivot post 22 will cause the actuating member to be deformed inwardly during movement between the neutral position and the left turn position. As soon as the axis of boss 30 has shifted to the left of a line extending from the pivot post 22 through the pivot pin 28, the resilience of the actuating member 26 will force the locking member 44 overcenter and into the left turn position. The actuating member 26 will remain in this position until reversal of the direction of rotation of canceling pin 42 brings the canceling pin into contact with the portion 52 of the finger 34 at which time the actuating member 26 will be driven back to its neutral position. It will, of course, be understood that movement of the actuating member 26 to the right turn position will cause a similar operation to take place.

While but one embodiment of the invention has been shown and described, it will be evident that numerous changes and modifications may be made therein. It should be understood that the invention is not limited to the embodiment shown but only by the scope of the claims which follow.

We claim:
1. A direction signal switch operating mechanism comprising a support member having first and second pivot posts extending therefrom, a deformable switch actuating member pivotably mounted on said support member and movable from a neutral position to an operating position on each side of said neutral position, an overcenter locking member having a part thereof rotatably attached to said actuating member and first and second spaced apart arcuate recesses formed opposite said part for pivotable motion about said first and second pivot posts respectively, said overcenter locking member coacting with one of said pivot posts to deform said actuating member during movement between said neutral position and one of said switch operating positions for releasably maintaining said actuating member in any one of said positions.

2. A direction signal switch operating mechanism comprising a support member having first and second pivot posts extending therefrom, a deformable switch actuating member pivotably mounted on said support member and movable from a neutral position to an operating position on each side of said neutral position, an overcenter locking member having a part thereof rotatably attached to said actuating member and first and second spaced apart arcuate recesses formed opposite said part for pivotable motion about said first and second pivot posts respectively, said overcenter locking member coacting with one of said pivot posts to deform said actuating member during movement between said neutral position and one of said switch operating positions for releasably maintaining said actuating member in any one of said positions, cam means movable in a circular path, canceling means integrally formed with said actuator for moving into the path of said cam means when said actuating member is moved to an operating position.

3. A direction signal switch operating mechanism comprising a support member having a pair of projections extending therefrom, a deformable ring-shaped switch actuating member pivotably mounted on said support member and movable between a neutral position and switch operating positions on each side of said neutral position, an overcenter locking member rotatably attached to said actuating member and pivotable about one of said projections when said actuating member is rocked from said neutral position to one of said operating positions, said locking member coacting with said one of said projections to deform said actuating member during a predetermined amount of travel between said neutral position and said one of said operating positions for releasably maintaining said actuating member in any one of said positions.

4. A switch operating mechanism comprising a support member having a pair of spaced pivot posts extending therefrom, a deformable switch actuating member pivotally mounted about a point on said support member, overcenter locking means of triangular configuration having an apex thereof rotatably mounted about a point on said actuating member with the base thereof having a pair of spaced arcuate recesses pivotally engaging said pivot posts, means for moving said actuating member from a neutral position to an operating position whereupon said actuating member is deformed until said point on said actuating member has moved overcenter relative to a line extending between said point on said support member and one of said pivot posts.

5. A direction signal switch operating mechanism comprising a support member having a pivot post extending therefrom, a deformable switch actuating member mounted for pivotable movement about a point on said support member, said switch actuating member being formed of a molded plastic material subject to cold flow when operating under a constant stress, a triangular-shaped overcenter locking member having a part thereof rotatably attached to said actuating member and pivotable about said pivot post, means for moving said actuating member from a neutral position to an operating position whereby said locking member in conjunction with said pivot post exerts a deforming force on said actuating member until said point on said actuating member has moved overcenter relative to a line extending between said point of said support member and said pivot post whereupon said deforming force is removed and said actuating member returns to its normal shape and is releasably maintained in said operating position.

6. A switch operating mechanism comprising a ring-shaped support member having a plurality of pivot posts extending therefrom, a deformable ring-shaped switch actuating member mounted for pivotable movement about a point on said support member, said switch actuating member being formed of a molded plastic material subject to cold flow when operating under a constant stress, a triangular-shaped overcenter locking member having a part thereof mounted for rotational movement about a point on said actuating member and having a plurality of spaced apart arcuate recesses formed opposite said part for pivotable motion about said pivot posts, an operating member attached to said actuating member for moving said actuating member from a neutral position to an operating position on either side of said neutral position, said locking member coacting with one of said pivot posts during movement to one of said operating positions to exert a deforming force on said actuating member until said point on said actuating member has moved overcenter relative to a line extending between said point on said support member and said one of said pivot posts thereby releasably maintaining said actuating member in one of said operating positions.

References Cited by the Examiner

UNITED STATES PATENTS

| | | | |
|---|---|---|---|
| 2,800,540 | 7/57 | Wagner | 200—61.34 |
| 2,800,542 | 7/57 | Barcus et al. | 200—61.34 |
| 2,810,031 | 10/57 | Hellstrom | 200—68 X |
| 2,831,082 | 4/58 | Mason | 200—166 X |
| 2,952,750 | 9/60 | Mason | 200—66 |
| 3,081,385 | 3/63 | Scott | 200—47 |

BERNARD A. GILHEANY, *Primary Examiner.*

ROBERT K. SCHAEFER, *Examiner.*